United States Patent
Bunazawa et al.

(10) Patent No.: US 12,437,587 B2
(45) Date of Patent: Oct. 7, 2025

(54) VEHICLE DIAGNOSTIC SYSTEM

(71) Applicant: TOYOTA JIDOSHA KABUSHIKI KAISHA, Toyota (JP)

(72) Inventors: Hideaki Bunazawa, Nagoya (JP); Shintaro Mukogawa, Nagoya (JP); Rikako Zenibana, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 18/341,772

(22) Filed: Jun. 27, 2023

(65) Prior Publication Data

US 2024/0257585 A1 Aug. 1, 2024

(30) Foreign Application Priority Data

Jan. 30, 2023 (JP) .................. 2023-012069

(51) Int. Cl.
*G07C 5/08* (2006.01)
*G06F 18/2413* (2023.01)

(52) U.S. Cl.
CPC ..... *G07C 5/0816* (2013.01); *G06F 18/24137* (2023.01); *G07C 5/0808* (2013.01)

(58) Field of Classification Search
None
See application file for complete search history.

(56) References Cited

U.S. PATENT DOCUMENTS

| 10,679,434 | B2 * | 6/2020 | Okude | G06F 30/15 |
| 2021/0049444 | A1 * | 2/2021 | Bielby | G07C 5/0808 |
| 2023/0054575 | A1 * | 2/2023 | Cohen | G06F 21/566 |
| 2023/0377382 | A1 | 11/2023 | Bunazawa et al. | |
| 2024/0043023 | A1 | 2/2024 | Bunazawa | |

FOREIGN PATENT DOCUMENTS

| JP | 2021081364 A | 5/2021 |
| JP | 2023169558 A | 11/2023 |
| JP | 2024022176 A | 2/2024 |
| JP | 2024050160 A | 4/2024 |
| WO | WO-2020050761 A1 * | 3/2020 |

* cited by examiner

*Primary Examiner* — Vivek D Koppikar
*Assistant Examiner* — David Ruben Pedersen

(57) ABSTRACT

A vehicle diagnostic system includes processing circuitry and a storage device. The storage device stores data of a learned model and cluster data created by inputting, to the learned model, pieces of sound data recorded using vehicles in which types of anomalies are different from each other and identified, outputting the pieces of generated data, and clustering, for each of the types of anomalies, a loss variable indicating a magnitude of an error in each of the variables in each piece of the generated data. The processing circuitry is configured to execute a loss calculation process that inputs diagnostic sound data of a target vehicle to the learned model and calculates the loss variable in the generated data and a diagnostic process that checks data of the loss variable calculated through the loss calculation process against the cluster data and outputs a diagnosis result of the target vehicle.

8 Claims, 3 Drawing Sheets

VEHICLE DIAGNOSTIC SYSTEM

BACKGROUND

1. Field

The present disclosure relates to a vehicle diagnostic system.

2. Description of Related Art

Japanese Laid-Open Patent Publication No. 2021-081364 discloses a cause identifying system that performs frequency analysis on the data of a recorded sound to identify the cause of generating an abnormal sound.

The cause identifying system performs Fourier transform on sound data and analyzes the data to identify the cause of generating an abnormal sound. Specifically, the cause identifying system divides the Fourier transformed dataset into multiple datasets. The cause identifying system performs a statistical analysis process on each of the divided datasets to calculate an anomaly degree. Then, the cause identifying system extracts divided data having a high anomaly degree as high anomaly degree divided data, and generates integrated data obtained by integrating the high anomaly degree divided data. The cause identifying system checks the cluster clustered for each occurrence cause against the integrated data to identify the cause of generating the anomaly.

The cause identifying system calculates a probability density for each of the divided datasets. Then, the cause identifying system calculates the anomaly degree from the calculated probability density by using an unconstrained least square density ratio estimation method. Thus, the cause identifying system needs to repeatedly perform a statistical analysis process many times.

A diagnostic system capable of performing diagnosis including identification of the type of anomaly more easily is desired.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a vehicle diagnostic system that diagnoses a target vehicle using sound data obtained by recording a sound produced from the target vehicle. The target vehicle is a vehicle to be diagnosed. The vehicle diagnostic system includes processing circuitry and a storage device. The storage device stores data of a learned model trained by supervised learning to generate operation data from training sound data using training data including the training sound data and the operation data. The training sound data is recorded while operating a reference vehicle in which no anomaly has occurred. The operation data includes variables. The operation data indicates an operation status of the reference vehicle collected simultaneously with the training sound data. The storage device further stores cluster data created by outputting pieces of generated data that is the operation data generated by the learned model using pieces of sound data recorded using vehicles in which types of anomalies are different from each other and identified and by clustering, for each of the types of anomalies, a loss variable indicating a magnitude of an error in each of the variables in each piece of the generated data from each of the variables in the pieces of the operation data collected simultaneously with the sound data. The processing circuitry is configured to execute a loss calculation process that inputs diagnostic sound data recorded while operating the target vehicle to the learned model, outputs the generated data, and calculates the loss variable in the generated data and a diagnostic process that checks data of the loss variable calculated through the loss calculation process against the cluster data, determines to which cluster the loss variable calculated through the loss calculation process belongs, and outputs a diagnosis result indicating that a type of anomaly corresponding to the cluster to which the loss variable is determined to belong has occurred in the target vehicle.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of a vehicle diagnostic system will be described with reference to FIGS. 1 to 6.

Configuration of Vehicle Diagnostic System

Figure 1:
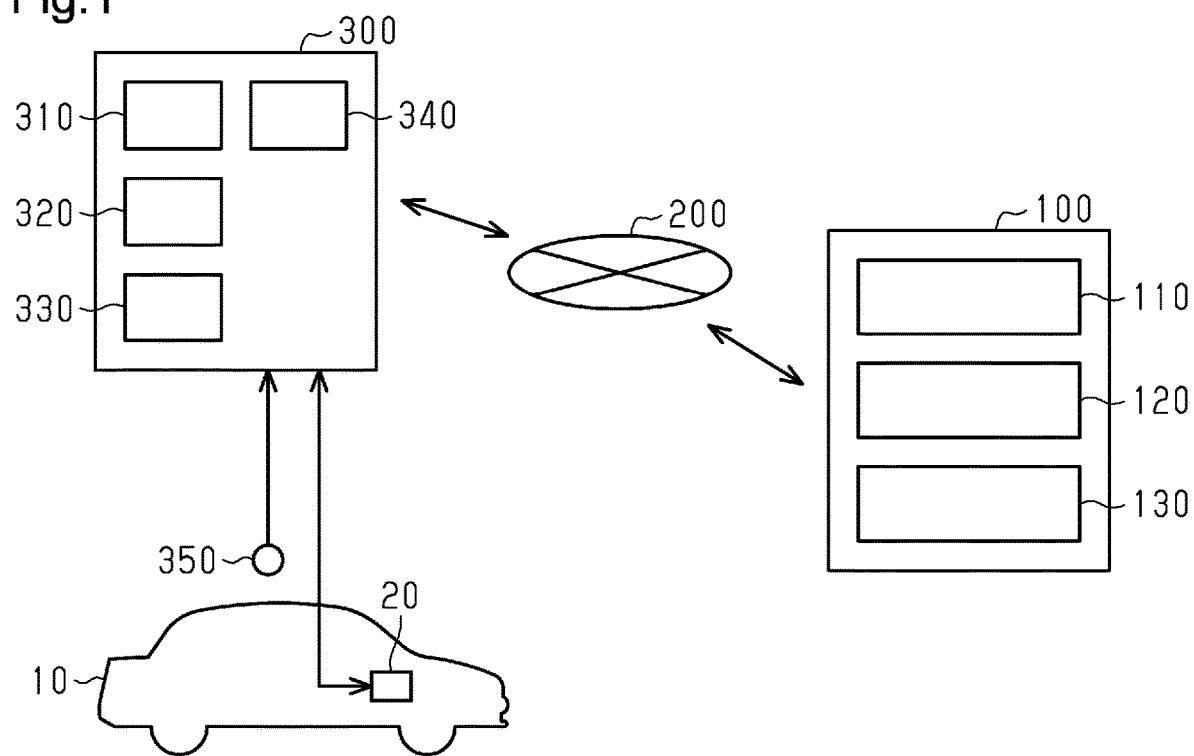
FIG. 1 is a schematic diagram showing an embodiment of a vehicle diagnostic system.

As shown in FIG. 1, the vehicle diagnostic system includes a data center 100 and a data acquisition device 300. The data center 100 is communicably connected to the data acquisition device 300 via a communication network 200. The data center 100 includes processing circuitry 110 and a storage device 120 that stores a program. The processing circuitry 110 executes the program stored in the storage device 120 to execute various processes. The data center 100 further includes a communication device 130.

The data acquisition device 300 is, for example, a personal computer. The data acquisition device 300 includes processing circuitry 310 and a storage device 320 that stores a program. The processing circuitry 310 executes the program stored in the storage device 320 to execute various processes. The data acquisition device 300 includes a communication device 330. In this embodiment, the data acquisition device 300 is connected to the data center 100 via the communication network 200 through wireless communication. The data acquisition device 300 includes a display device 340 that displays information. The data acquisition device 300 includes a microphone 350.

The vehicle diagnostic system diagnoses a target vehicle 10, which is a vehicle to be diagnosed. To perform diagnosis, the microphone 350 is installed at a predetermined position from the target vehicle 10. Further, the data acquisition device 300 is connected to a vehicle control unit 20 of the target vehicle 10. Then, a person controls the target vehicle 10 to operate the target vehicle 10 in a measurement driving pattern. The measurement driving pattern is suitable for acquiring data used to perform diagnosis. The measurement driving pattern is a predetermined operation pattern performed for a predetermined period of time. During operation of the target vehicle 10 in the measurement driving pattern, the data acquisition device 300 records a sound with the microphone 350. The data acquisition device 300 acquires operation data indicating the operation status of the target vehicle 10 at the same time as recording sound data.

The vehicle control unit 20 controls components of the target vehicle 10. Various sensors that detect the state of the target vehicle 10 are connected to the vehicle control unit 20. When the data acquisition device 300 is connected to the vehicle control unit 20, the data acquisition device 300 can acquire information related to the target vehicle 10 via the vehicle control unit 20.

Outline of Diagnosis by Vehicle Diagnostic System

As described above, in the vehicle diagnostic system, the data acquisition device 300 is connected to the vehicle control unit 20 of the target vehicle 10 to diagnose the target vehicle 10. During operation of the target vehicle 10, the data acquisition device 300 records a sound with the microphone 350. The data acquisition device 300 sends, for example, data of the recorded sound to the data center 100. Then, the data center 100 diagnoses the target vehicle 10 using the data received from the data acquisition device 300.

The data acquisition device 300 records sound data recorded by the microphone 350 in the storage device 320 as diagnostic sound data while operating the target vehicle 10 in the measurement driving pattern. The data acquisition device 300 stores, in the storage device 320, the operation data collected simultaneously with the sound data. For example, when the transmission of the target vehicle 10 is diagnosed, the operation data includes an engine rotation speed NE, an input rotation speed Nin, an output rotation speed Nout, and a gear ratio. The data acquisition device 300 stores, in the storage device 320 as a dataset corresponding to the predetermined period of time, the operation data including the diagnostic sound data collected in this manner.

The data acquisition device 300 extracts a dataset corresponding to the predetermined period of time stored in the storage device 320 while changing an extraction start time, and formats the dataset into diagnostic data. The diagnostic data is extracted for each data in a range of a window Tw having a time width shorter than the predetermined period of time. That is, the data acquisition device 300 extracts data corresponding to a period shorter than the predetermined period of time from the dataset, and formats the data into diagnostic data. In a data formatting process that formats the diagnostic sound data, the data acquisition device 300 converts the diagnostic sound data into a mel spectrogram and handles the mel spectrogram as image data. The vertical axis of the mel spectrogram represents a frequency indicated by the mel scale, and the horizontal axis represents time. In the mel spectrogram, intensity is represented by the differences in color. A portion having a lower intensity is displayed in a dark blue color, and a portion having a higher intensity is displayed in a bright red color. The sound data included in one dataset corresponding to the predetermined period of time is one mel spectrogram corresponding to the predetermined period of time. The data acquisition device 300 sends the formatted diagnostic data to the data center 100. Upon receiving the diagnostic data, the data center 100 stores the diagnostic data in the storage device 120. Then, the data center 100 executes the routine illustrated in FIG. 2 to diagnose the target vehicle 10. The routine is executed by the processing circuitry 110 of the data center 100. In the following description, the number of each process is represented by the letter S followed by a numeral.

Figure 2:
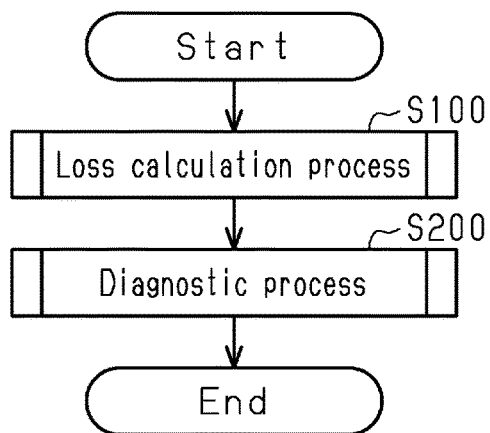
FIG. 2 is a flowchart illustrating the flow of processes related to diagnosis of the target vehicle.

As shown in FIG. 2, the data center 100 executes a loss calculation process (S100) and a diagnostic process (S200) to diagnose the target vehicle 10. The loss calculation process (S100) is a process that calculates a loss variable LOS by inputting the diagnostic sound data included in the diagnostic data to the learned model. The loss variable LOS is a value indicating the magnitude of an error in the generated data generated by the learned model using the diagnostic sound data.

The learned model is trained using a large amount of training data including training sound data and operation data collected simultaneously with the training sound data. Further, the learned model is trained by supervised learning so that the operation data can be generated from the training sound data. For example, the data center 100 handles the diagnostic sound data as image data. Thus, the data center 100 uses a model partially using ResNet-18, which is an image classification model. ResNet-18 is a pre-trained image classification model learned on an ImageNet dataset. ResNet-18 is trained with the data of over one million images and can classify input images into one thousand categories. The learned model stored in the storage device 120 of the data center 100 is obtained by performing transfer learning on pre-trained ResNet-18. The learned model is obtained by replacing the output layer for classification of ResNet-18 with a neural network MLP and training the neural network MLP by supervised learning. The training refers to adjusting the weight and bias of each layer of the neural network MLP. The training sound data is recorded while operating a reference vehicle, which is a vehicle in a state serving as a reference for diagnosis, in the measurement driving pattern. In this example, the reference vehicle is a vehicle that has completed a certain period of break-in operation after manufacturing, undergone thorough maintenance and inspection, and has been confirmed to have no anomalies.

The learned model is optimized to generate the operation data from a sound produced from the reference vehicle. Thus, when the diagnostic sound data produced from the target vehicle 10 in a state different from that of the reference vehicle is input, the data of the operation state cannot be correctly generated. That is, when the state of the target vehicle 10 deviates from that of the reference vehicle, deviation occurs between the operation data stored in the dataset as correct answer data and the generated data generated from the sound produced from the target vehicle 10. That is, the state of the target vehicle 10 deviates from the state of the reference vehicle by the magnitude of the deviation. As described above, the reference vehicle is in a state that includes no anomaly. Thus, the vehicle diagnostic system diagnoses an anomaly in the target vehicle 10 based on the deviation; that is, the error in the generated data. The manner in which the error appears differs depending on the type of anomaly.

Figure 3:
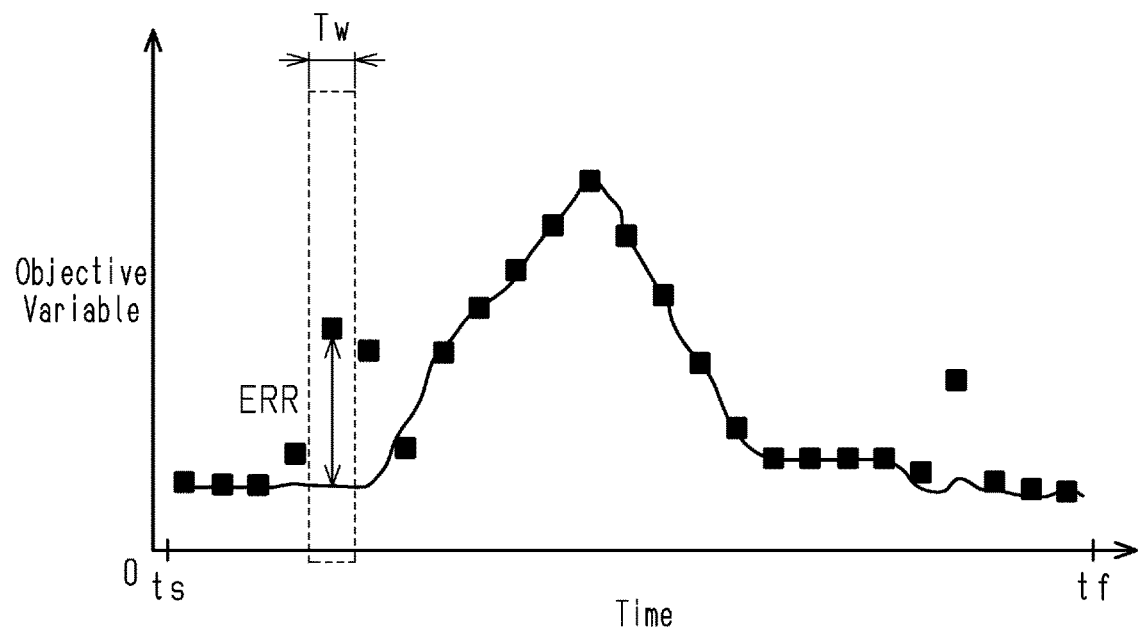
FIG. 3 is a graph illustrating the generated data, the operation data, and errors in the generated data.

FIG. 3 is a graph illustrating the operation data, which is correct data, and the generated data, which is generated by the learned model using the diagnostic sound data. The graph of FIG. 3 illustrates only one of variables included in the operation data. That is, the graph illustrates only one of objective variables, which are outputs of the learned model. In FIG. 3, the operation data is indicated by a solid line. In FIG. 3, the generated data is indicated by square symbols. In FIG. 3, time ts is a start time of the measurement operation pattern, and time tf is an end time of the measurement operation pattern. That is, FIG. 3 illustrates the operation data and the generated data in one dataset. The learned model outputs values of the generated data in the window Tw one by one for each variable based on the data in the range of the window Tw formatted into the list. An error ERR indicates deviation (error) of the generated data from the operation data. The error ERR increases as the state of the target vehicle 10 deviates from the state of the reference vehicle. Thus, the vehicle diagnostic system calculates the loss variable LOS, which is the sum of the errors ERR of the variables included in the operation data in one dataset, through the loss calculation process. The loss variable LOS is a set of sums of errors ERR in one dataset for each of the variables included in the operation data. Thus, the loss variable LOS is a vector having the number of dimensions that is equal to the number of variables included in the operation data. For example, when there are two variables (e.g., a first variable and a second variable), the loss variable LOS is a two dimensional vector including a first loss variable LOS1 and a second loss variable LOS2. The loss variable LOS only needs to indicate the magnitude of an error. Hence, the loss variable LOS is not limited to a simple sum of the errors ERR. For example, a process of excluding an outlier from the errors ERR may be performed as pre-processing of calculating the loss variable LOS, and a sum of the errors ERR excluding the outlier may be set as the loss variable LOS. Alternatively, the median value of the error ERR may be used as the loss variable LOS.

The storage device 120 of the data center 100 stores cluster data created by using pieces of sound data recorded by using a vehicle in which the type of anomaly is identified. As described above, the manner in which the error appears differs depending on the type of anomaly.

Figure 4:
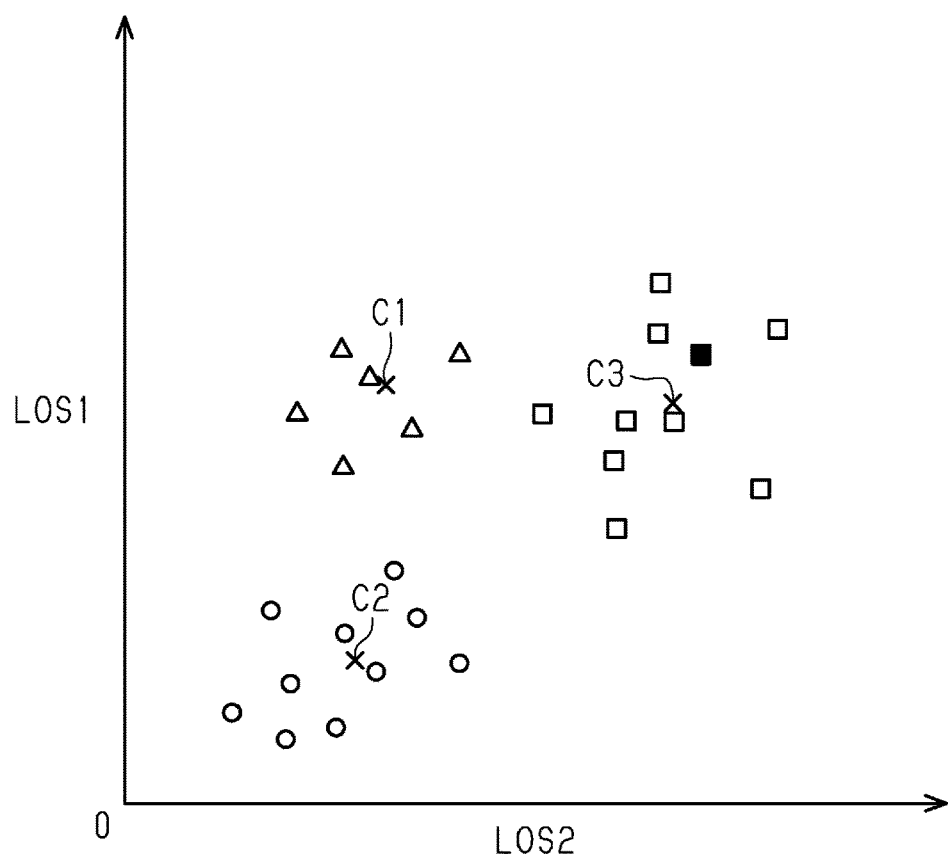
FIG. 4 is a graph showing an example of clusters.

FIG. 4 shows the distribution of the loss variable LOS consisting of cluster data. The vertical axis in FIG. 4 represents the magnitude of the first loss variable LOS1. The first loss variable LOS1 is the sum of the errors ERR for the first variable of the operation data. The horizontal axis in FIG. 4 represents the magnitude of the second loss variable LOS2. The second loss variable LOS2 is the sum of the errors ERR for the second variable of the operation data.

FIG. 4 illustrates cluster data created using three test vehicles in which the types of anomalies are respectively identified. The anomalies of the three test vehicles are different from each other. The cluster data is created for each of the three test vehicles by using multiple pieces of sound data recorded by repeating test traveling in the measurement driving pattern a number of times. The cluster data is created by clustering, for each type of anomaly, the loss variables LOS calculated by executing the same process as the loss calculation process using the pieces of recorded sound data.

In FIG. 4, the coordinates of the loss variable LOS classified into a first cluster, which corresponds to a first test vehicle in which a first anomaly has occurred, are indicated by white triangles. In FIG. 4, the coordinates of the loss variable LOS classified into a second cluster, which corresponds to a second test vehicle in which a second anomaly has occurred, are indicated by white circles. In FIG. 4, the coordinates of the loss variable LOS classified into a third cluster, which corresponds to a third test vehicle in which a third anomaly has occurred, are indicated by white squares. In FIG. 4, the centroid of each cluster is indicated by a cross mark. Centroid C1 is the centroid of the first cluster. Centroid C2 is the centroid of the second cluster. Centroid C3 is the centroid of the third cluster.

The storage device 120 of the data center 100 stores, as the cluster data, the data of the centroid of each cluster of the loss variable LOS clustered for each type of anomaly. FIG. 4 illustrates an example in which the loss variable LOS includes two variables. The number of variables included in the loss variable LOS is equal to the number of variables included in the operation data. That is, FIG. 4 is an example of a space in which coordinates are defined by the magnitude of the error in each variable included in the operation data. The number of clusters to be classified, that is, the number of types of anomalies to be diagnosed is not limited to three, and may be two or four or more. A test vehicle may be prepared in accordance with the type of anomaly to be diagnosed, and the loss variable LOS may be calculated to create cluster data.

The vehicle diagnostic system performs the diagnostic process using the cluster data stored in the storage device 120, that is, the data of the centroid of each cluster.

Hereinafter, the contents of the loss calculation process and the diagnostic process will be described with reference to flowcharts.

Loss Calculation Process

As described above, upon receiving the diagnostic data, the data center 100 stores the diagnostic data in the storage device 120. Then, the processing circuitry 110 of the data center 100 executes the routine illustrated in FIG. 2.

As shown in FIG. 2, when starting the routine, the processing circuitry 110 first executes the loss calculation process (S100).

Figure 5:
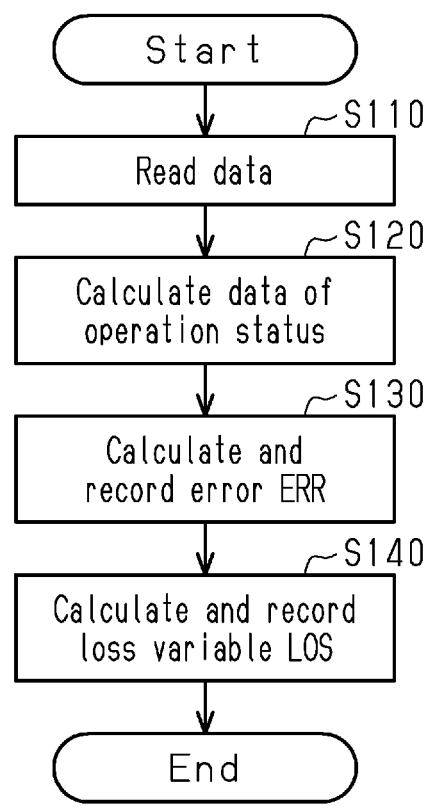
FIG. 5 is a flowchart illustrating the flow of processes in the loss calculation process.

FIG. 5 is a flowchart illustrating the flow of processes in the routine of the loss calculation process. After starting the routine, the processing circuitry 110 reads the diagnostic data (S110). Then, the processing circuitry 110 sequentially inputs the lists included in the read diagnostic data to the learned model, and calculates each piece of data of the operation status (S120). That is, the processing circuitry 110 generates pieces of generated data. Next, the processing circuitry 110 calculates the magnitudes of the errors ERR in the generated data for each of the variables included in the operation data collected at the same time as the diagnostic sound data for all pieces of the generated data (S130). Then, the processing circuitry 110 records the calculated errors ERR in the storage device 120 (S130).

Subsequently, the processing circuitry 110 calculates the loss variable LOS (S140). Then, the processing circuitry 110 records the calculated loss variable LOS in the storage device 120 (S140). After recording the loss variable LOS, the processing circuitry 110 terminates the routine.

As illustrated in FIG. 2, when the loss calculation process (S100) ends, the processing circuitry 110 executes the diagnostic process (S200).

Diagnostic Process

Figure 6:
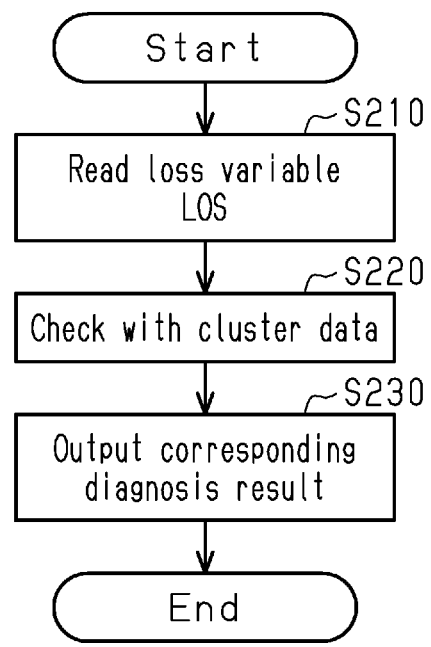
FIG. 6 is a flowchart illustrating the flow of processes in the diagnostic process.

FIG. 6 is a flowchart illustrating the flow of processes in the routine of the diagnostic process. After starting the routine, the processing circuitry 110 reads the sample data of the loss variable LOS recorded in the storage device 120 (S210).

Next, the processing circuitry 110 checks the cluster data recorded in the storage device 120 against the loss variable LOS to determine to which cluster the loss variable LOS belongs (S220). For example, the processing circuitry 110 calculates the distances between the loss variable LOS and the centroids of the clusters. Then, the processing circuitry 110 determines that the loss variable LOS belongs to the cluster having the centroid with the smallest distance. For distance calculation, any distance calculation method such as an Euclidean distance method, a Mahalanobis distance method, or a Manhattan distance method may be used. A calculation method suitable for diagnosis only needs to be employed.

In FIG. 4, the coordinates of the loss variable LOS calculated through the loss calculation process are indicated by black square symbols. In the example shown in FIG. 4, the centroid closest to the coordinates of the loss variable LOS is centroid C3. Thus, in this example, the processing circuitry 110 determines that the loss variable LOS belongs to the third cluster.

When the distance from the origin at which all of the errors in the variables are 0 to the coordinates of the loss variable LOS is within a predetermined distance, the processing circuitry 110 determines that no anomaly has occurred in the target vehicle 10. The predetermined distance is sized such that the processing circuitry 110 can determine that the state of the target vehicle 10 is relatively close to the state of the reference vehicle and the coordinates of the loss variable LOS are so close to the origin that the processing circuitry 110 can determine that no anomaly has occurred.

Next, the processing circuitry 110 outputs a diagnosis result corresponding to the determination result (S230). Specifically, the processing circuitry 110 outputs a diagnosis result indicating that the type of anomaly corresponding to the cluster to which the loss variable LOS is determined to belong has occurred in the target vehicle 10. For example, in the example illustrated in FIG. 4, the processing circuitry 110 outputs a diagnosis result indicating that the third anomaly corresponding to the third cluster has occurred. When determining that no anomaly has occurred in the target vehicle 10, the processing circuitry 110 outputs a diagnosis result indicating that the target vehicle 10 is normal.

After outputting the diagnosis result, the processing circuitry 110 ends the routine. That is, the processing circuitry 110 ends the diagnostic process and ends the series of routines illustrated in FIG. 2.

The data acquisition device 300 that has received the diagnosis result displays the received diagnosis result on the display device 340 as a diagnosis result of the target vehicle 10.

Operation of Present Embodiment

The data center 100 generates generated data that is obtained by restoring the operation data from the diagnostic data using the learned model. Then, the data center 100 executes the loss calculation process (S100), which calculates the loss variable LOS in the generated data.

In the diagnostic process (S200), the data center 100 checks the coordinates of the loss variable LOS against the cluster data. Then, the data center 100 diagnoses that the type of anomaly corresponding to the cluster to which the loss variable LOS belongs has occurred.

The vehicle diagnostic system uses the loss variable LOS calculated by comparing the operation data with the generated data that has been calculated using the learned model. In the loss variable LOS, a difference in state between the target vehicle 10 and the reference vehicle appears. Further, in the loss variable LOS, a feature corresponding to the type of anomaly that has occurred in the target vehicle 10 also appears. Therefore, it is possible to specify the type of anomaly of the target vehicle 10 by checking the loss variable LOS of the target vehicle 10 against the data of the plurality of clusters created using the loss variable LOS of the plurality of vehicles in which the type of anomaly is specified.

Advantages of Present Embodiment (1) The vehicle diagnostic system uses the learned model. Accordingly, diagnosis including identification of the type of anomaly is easily performed using the diagnostic sound data.

(2) When the distance from the origin to the coordinates of the loss variable LOS is within the predetermined distance, the processing circuitry 110 outputs, in the diagnostic process, a diagnosis result indicating that no anomaly has occurred in the target vehicle 10. The closer the state of the target vehicle 10 is to the state of the reference vehicle, the smaller the error between the generated data and the operation data. That is, when there is no anomaly in the target vehicle 10, the coordinates of the loss variable LOS are relatively close to the origin. The vehicle diagnostic system can diagnose that an anomaly has not occurred in the target vehicle 10 based on the fact that the distance from the origin to the coordinates of the loss variable LOS is within the predetermined distance.

Modifications

The present embodiment may be modified as follows. The present embodiment and the following modifications can be combined as long as they remain technically consistent with each other.

The data used as the measurement data is not limited to a mel spectrogram. For example, a spectrogram obtained by performing wavelet transform on sound data may be used. Alternatively, a spectrogram obtained by performing short-time Fourier transform on sound data may be used. Sound data does not have to be converted into image data. For example, a feature may be extracted from sound data and used as diagnostic data. This eliminates the need for using ResNet-18, which handles image data, as the learned model. Although a model obtained by performing transfer learning on ResNet-18 has been explained, the configuration of the model is not limited to such a configuration. The learned model only needs to output the generated data based on the diagnostic data.

In the above embodiment, the data of the centroid of each cluster is stored in the storage device 120 as cluster data. The cluster data is not limited to data of a centroid. The cluster data only needs to be data that can be checked against the data of the loss variable LOS calculated through the loss calculation process to determine to which cluster the loss variable LOS belongs. For example, the cluster data may be data in which the values of all loss variables of each cluster are stored.

The vehicle diagnostic system may include only the data acquisition device 300. In this case, the data of the learned model and the cluster data are stored in the storage device 320. In this case, the processing circuitry 310 of the data acquisition device 300 executes the loss calculation process and the diagnostic process.

The data acquisition device 300 does not have to include the microphone 350. Sound data may be acquired from an external device to perform the loss calculation process. The loss calculation process may be performed using pieces of sound data recorded using microphones 350.

In the diagnostic process, the processing circuitry 110 may output a diagnosis result indicating that an anomaly other than the anomaly corresponding to each cluster has occurred to the target vehicle 10 when determining that the anomaly does not belong to any cluster.

In this case, when all of the distances between the coordinates of the loss variable LOS and the centroids of the clusters are greater than a distance set as the upper limit, the processing circuitry 110 outputs a diagnosis result indicating that an anomaly other than the anomaly corresponding to each cluster has occurred to the target vehicle 10.

Based on the fact that the distance between the centroid of each cluster and the loss variable LOS calculated through the error detection process is greater than an upper limit threshold, the processing circuitry 110 determines that the cluster does not belong to any cluster. the processing circuitry 110 determines that an anomaly other than the anomaly corresponding to each cluster has occurred. An upper limit distance may be set as the upper limit of a distance at which it is determined that the loss variable LOS belongs to a cluster.

Diagnosis may be performed by performing operation for acquiring diagnostic data a number of times and calculating loss variables LOS. For example, the diagnostic process may be performed by calculating the average value of the loss variables LOS and using the average value.

In the above embodiment, as the example of the case in which diagnosis of the transmission of the target vehicle 10 is performed, an example in which the data of the rotation speed of a rotation shaft in a power train is included in the operation data has been described. The vehicle diagnostic system may diagnose the target vehicle 10 by diagnosing another unit in the target vehicle 10. For example, the diagnosing of the drive motor may use the data of the engine speed NE, the ignition timing, and the engine load factor as the operation data. For example, the diagnosing of the drive motor may use the data of the rotation speed of an output shaft of a motor as the operation data. The diagnosing of the four-wheel drive vehicle may use the data of the rotation speed of each drive wheel as the operation data.

In the above embodiment, the vehicle diagnostic system includes the processing circuitry 110 and the storage device 120, and executes software processing. However, this is merely exemplary. For example, the vehicle diagnostic system may include a dedicated hardware circuit (such as ASIC) that executes at least part of the software processes executed in the above-described embodiments. That is, the vehicle diagnostic system may have any one of the following configurations (A) to (C). (A) The vehicle diagnostic system includes an execution device that executes all the processes in accordance with a program and a storage device that stores the program. That is, the vehicle diagnostic system includes a software execution device. (B) The vehicle diagnostic system includes an execution device that executes some of the processes in accordance with a program, and a storage device. Further, the vehicle diagnostic system includes a dedicated hardware circuit that performs the remaining processes. (C) The vehicle diagnostic system includes a dedicated hardware circuit that executes all the processes. There may be multiple software execution devices and/or dedicated hardware circuits. That is, the above processes may be executed by processing circuitry that includes at least one of a set of one or more software execution devices and a set of one or more dedicated hardware circuits. The storage device (i.e., computer-readable medium) that stores a program includes any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle diagnostic system that diagnoses a target vehicle using sound data obtained by recording a sound produced from the target vehicle, the target vehicle being a vehicle to be diagnosed, the vehicle diagnostic system comprising:
    processing circuitry; and
    a computer-readable medium, wherein
    the computer-readable medium stores:
    data of a learned model trained by supervised learning to generate operation data from training sound data using training data including the training sound data and the operation data, the training sound data being recorded while operating a reference vehicle in which no anomaly has occurred, the operation data including variables, and the operation data indicating an operation status of the reference vehicle collected simultaneously with the training sound data; and
    cluster data created by outputting pieces of generated data that is the operation data generated by the learned model using pieces of sound data recorded using vehicles in which types of anomalies are different from each other and identified and by clustering, for each of the types of anomalies, a loss variable indicating a magnitude of an error in each of the variables in each piece of the generated data from each of the variables in the pieces of the operation data collected simultaneously with the sound data, wherein the loss variable is a set of sums of errors in one dataset for each of the variables included in the operation data, and
    the processing circuitry is configured to execute:
    a loss calculation process that inputs diagnostic sound data recorded while operating the target vehicle to the learned model, outputs the generated data, and calculates the loss variable in the generated data; and
    a diagnostic process that checks data of the loss variable calculated through the loss calculation process against the cluster data, determines to which cluster the loss variable calculated through the loss calculation process belongs, and outputs a diagnosis result indicating that a type of anomaly corresponding to the cluster to which the loss variable is determined to belong has occurred in the target vehicle, in the diagnostic process, the processing circuitry is configured to:

calculate distances between coordinates of the loss variable in a space in which coordinates are defined by a magnitude of an error in each of the variables included in the operation data and centroids of the clusters in the space;

determine that the loss variable belongs to the cluster having the centroid closest to the coordinates of the loss variable; and that the type of anomaly corresponding to the cluster to which the loss variable is determined to belong has occurred in the target vehicle.

2. The vehicle diagnostic system according to claim 1, wherein, in the diagnostic process, the processing circuitry is configured to output a diagnosis result indicating that an anomaly other than an anomaly corresponding to each of the clusters has occurred in the target vehicle when all of the distances between the coordinates of the loss variable and the centroids of the clusters are greater than a distance that is set as an upper limit.

3. The vehicle diagnostic system according to claim 1, wherein, in the diagnostic process, the processing circuitry is configured to output a diagnosis result indicating that no anomaly has occurred in the target vehicle when a distance from an origin at which all of the errors in the variables are 0 to the coordinates of the loss variable is within a predetermined distance.

4. The vehicle diagnostic system according to claim 1, wherein the operation data includes data of a rotation speed of a rotation shaft in a power train.

5. The vehicle diagnostic system according to claim 1, wherein the processing circuitry is configured to perform a process of excluding an outlier from the errors as pre-processing of calculating the loss variable.

6. The vehicle diagnostic system according to claim 1, wherein the distances are calculated using an Euclidean distance method, a Mahalanobis distance method, or a Manhattan distance method.

7. The vehicle diagnostic system according to claim 1, further comprising a data acquisition device connected to a vehicle control unit of the target vehicle, wherein the data acquisition device is configured to acquire the operation data at the same time as recording the sound data.

8. The vehicle diagnostic system according to claim 7, wherein the data acquisition device includes a display device that displays the diagnosis result of the target vehicle.

* * * * *